(12) United States Patent
Brands

(10) Patent No.: US 9,503,260 B2
(45) Date of Patent: Nov. 22, 2016

(54) SECURITY TOKEN AND SERVICE ACCESS SYSTEM

(71) Applicant: NXP B.V., Eindhoven (NL)

(72) Inventor: Jan René Brands, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/164,440

(22) Filed: Jan. 27, 2014

(65) Prior Publication Data

US 2014/0215218 A1 Jul. 31, 2014

(30) Foreign Application Priority Data

Jan. 31, 2013 (EP) .................................... 13153504

(51) Int. Cl.
*H04L 9/32* (2006.01)
*H04L 9/08* (2006.01)
*H04L 29/06* (2006.01)

(52) U.S. Cl.
CPC .......... *H04L 9/0897* (2013.01); *H04L 9/3271* (2013.01); *H04L 63/0853* (2013.01)

(58) Field of Classification Search
CPC ...................... H04L 12/417; G06F 2221/2103
See application file for complete search history.

(56) References Cited

U.S. PATENT DOCUMENTS

| | | | |
|---|---|---|---|
| 6,385,729 B1* | 5/2002 | DiGiorgio et al. | 726/9 |
| 7,043,643 B1* | 5/2006 | Doe et al. | 713/189 |
| 7,865,738 B2 | 1/2011 | Buck et al. | |
| 8,112,787 B2 | 2/2012 | Buer | |
| 8,171,531 B2 | 5/2012 | Buer | |
| 8,214,888 B2 | 7/2012 | Noe et al. | |
| 8,977,847 B1* | 3/2015 | Juels | H04L 9/3271 713/162 |
| 2004/0098596 A1 | 5/2004 | Elteto et al. | |
| 2006/0142064 A1* | 6/2006 | Rush et al. | 455/558 |
| 2008/0040276 A1* | 2/2008 | Hammad | G06Q 20/085 705/44 |
| 2009/0106824 A1 | 4/2009 | Morel et al. | |
| 2011/0023103 A1 | 1/2011 | Dietrich et al. | |
| 2011/0058516 A1 | 3/2011 | Small et al. | |
| 2012/0204245 A1 | 8/2012 | Ting et al. | |
| 2012/0265988 A1 | 10/2012 | Ehrensvard | |
| 2013/0086389 A1* | 4/2013 | Suwald | 713/185 |
| 2013/0102250 A1* | 4/2013 | Mutikainen et al. | 455/41.2 |
| 2013/0326218 A1* | 12/2013 | Burch et al. | 713/168 |

FOREIGN PATENT DOCUMENTS

EP 1 336 914 A2 8/2003
EP 2 034 458 A2 3/2009

(Continued)

OTHER PUBLICATIONS

Android Developers; "Ndef"; Retrieved from the Internet http://developer.android.com/reference/android/nfc/tech/Ndef.html, Jan. 16, 2014; 9 pages.

(Continued)

*Primary Examiner* — Josnel Jeudy

(57) ABSTRACT

According to an aspect of the invention, a security token for facilitating access to a remote computing service via a mobile device is conceived, said security token comprising an NFC interface, a smart card integrated circuit and a smart card applet stored in and executable by said smart card integrated circuit, wherein the smart card applet is arranged to support a cryptographic challenge-response protocol executable by the mobile device.

11 Claims, 2 Drawing Sheets

(56) References Cited

FOREIGN PATENT DOCUMENTS

| EP | 2 182 493 A1 | 5/2010 |
| GB | 2476989 A | 7/2011 |
| WO | 2005/022288 A2 | 3/2005 |
| WO | 2012/041595 A2 | 4/2012 |
| WO | 2012/103584 A1 | 8/2012 |

OTHER PUBLICATIONS

Android Developers; "NFC Basics"; retrieved from the Internet Jan. 16, 2014 http://developer.android.com/guide/topics/connectivity/nfc/nfc.html#aa4; 16 pages.
Google-Authenticator; "Two-step Verification"; retrieved from the Internet Jan. 16, 2014 http://code.google.com/p/google-authenticator/ 2 pages.
Yubico; "Using the YubiKey with Gmail's 2 Step Verification"; retrieved from the Internet Oct. 18, 2012 http://static.yubico.com/var/uploads/pds/Howto GmailYubiKey.pdf 7 pages.
idOnDemand; Fact Sheet (Dec. 11, 2012).
Oath; "Oath Reference Architecture Release 1.0"; retrieved from the Internet Jan. 16, 2014 www.openauthentication.org/ ; 38 pages.
Oath; "Oath Reference Architecture Release 2.0"; retrieved from the Internet Jan. 16, 2014 www.openauthentication.org/ ; 38 pages.
Wikipedia; "Secure Token"; retrieved from the Internet Jan. 16, 2014 http://en.wikipedia.org/wiki/Securitytoken 6 pages.
Wikipedia; "Two-step verification"; retrieved from the Internet Jan. 16, 2014 http://en.wikipedia.org/wiki/Two-factoratithentication 3 pages.
Yubico; "YubiKey NEO"; retrieved from the Internet Jan. 16, 2014 http://www.yubico.com/yubikey-neo 2 pages.
NFC Forum; "NFC Data Exchange Format (NDEF) Technical Specification 1.0"; 25 pages (Jul. 24, 2006).
NEC Forum; "NEC Record Type Definition (RTD) Technical Specification 1.0"; 20 pages (Jul. 24, 2006).
NFC Forum; "NFC URI Record Type Definition Technical Specification 1.0"; 14 pages (Jul. 24, 2006).
NFC Forum; "Type 4 Tag Operation Technical Specification 2.0"; 38 pages (Nov. 18, 2010).
Extended European Search Report for Appln. No. 13153504.9 (Jun. 3, 2013).

* cited by examiner

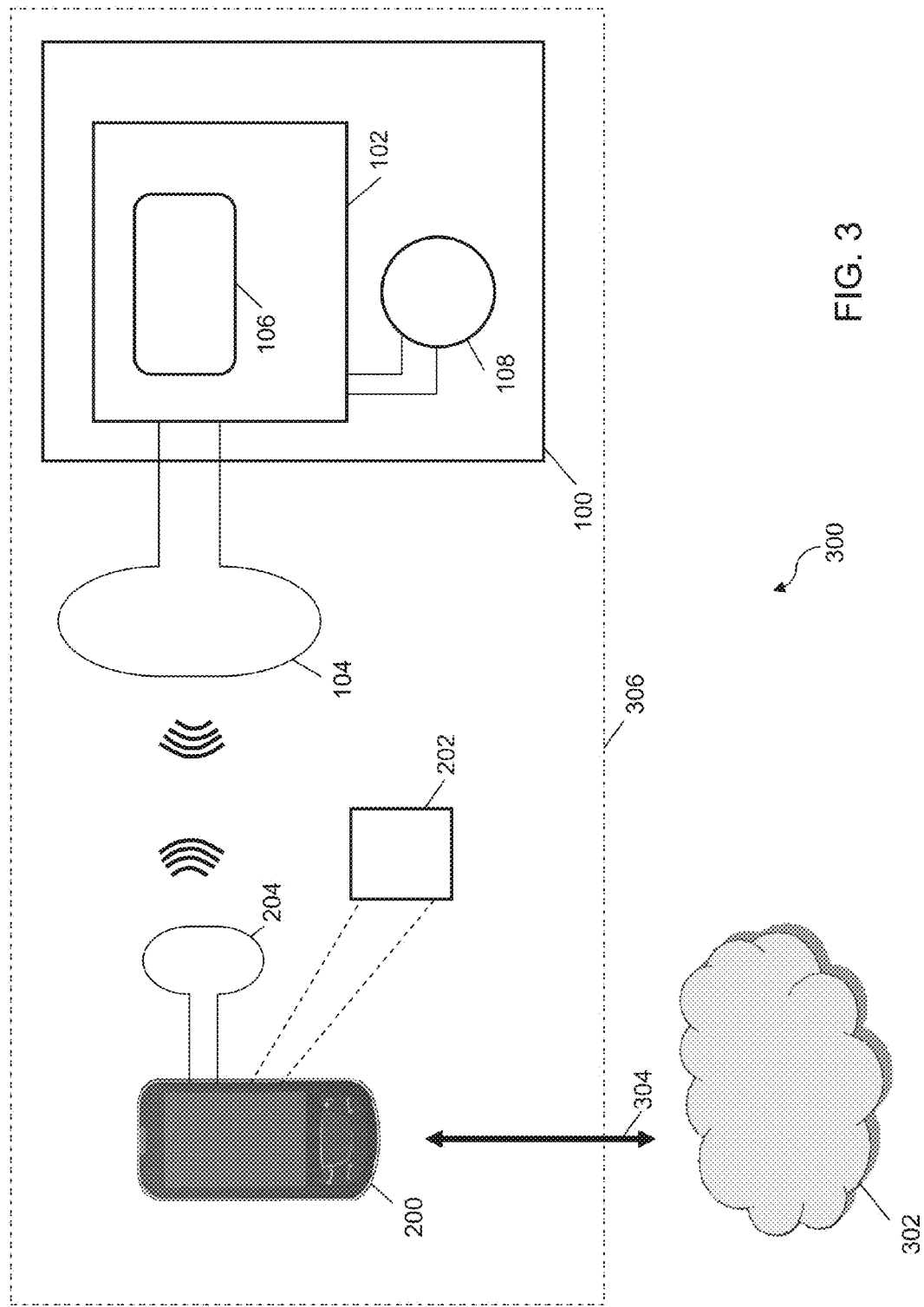

SECURITY TOKEN AND SERVICE ACCESS SYSTEM

CROSS-REFERENCE TO RELATED APPLICATIONS

This application claims the priority under 35 U.S.C. §119 of European patent application no. 13153504.9, filed on Jan. 31, 2013, the contents of which are incorporated by reference herein.

FIELD OF THE INVENTION

The invention relates to a security token. The invention further relates to a service access system,

BACKGROUND OF THE INVENTION

A security token—also referred to as a hardware token, authentication token, USB token, cryptographic token, or key fob—is a physical device which facilitates remote access to computing services, for example in the so-called "cloud", and which improves the security of (remote) authentication. The security token makes a login code available, for example on a display or via USB, which the owner of the token may use to log in to a particular computing service. This type of authentication is called two-factor authentication, since the user needs, besides the normal user account details, also the security token to be able to get access.

Security tokens are typically used in connection with a desktop PC or a laptop to access corporate computing services or networks or on-line bank accounts. In recent years, more and more cloud-based consumer services have also started to offer two-factor authentication. Examples include Google, Amazon Web Services, Dropbox, Wordpress, DreamHost, Drupal and Lastpass.

Login codes generated by more advanced security tokens are usually based on the current time of day. The security token will therefore contain a clock and a battery in order to be able to keep the time. To enhance the security of the authentication process, a direct connection between the (back-end) computing service and the security token is preferred, for example to be able to authenticate by performing a cryptographically secure challenge-response protocol with the back-end. The OATH standard provides a set of commonly used authentication protocol specifications that include both time-based and challenge-response based authentication mechanisms.

Currently, a direct connection between a security token and a back-end server is usually accomplished by using a security token in the form of e.g. a smart card, a USB dongle or a Bluetooth token inserted or connected to the PC on which the user accesses the service. The challenge-response protocol removes the need for a clock and, hence, in case of a smart card or a USB dongle, the need for a battery. In practice, systems sometimes combine time-based authentication and challenge-response-based authentication. For example, on-line banking time-based authentication is used to get read access to transaction records, while challenge-response authentication is used to for entering new transactions.

Increasingly, computer users are using mobile devices such as mobile phones and tablets (e.g. iPad) to access such cloud and other computing services. Mobile devices usually do not have a smart card slot and often have no USB-host capability. Bluetooth is often present on such devices, but usually only to support particular kinds of devices, such as an audio headset or keyboard and mouse. It is quite often not easy (or with some mobile platforms even impossible) to install additional support for other types of Bluetooth devices such as a Bluetooth security token. Alternative solutions for mobile devices exist, for example using the standard audio jack for input.

Another approach for mobile devices, such as smartphones, is to implement a security token in the form of software: a so-called "app", i.e. a computer program, on the mobile devices functions like a stand-alone security token. The user can type in the login code displayed on his mobile device into his laptop or computer. Alternatively, if the computing service is accessed on the mobile device itself, the login code can be copied from the security-token app to the clipboard and then pasted into the required field in the app where the login screen for the computing service is displayed (e.g. in the web browser). A well-known example of such an app is Google's Authenticator app, available for several mobile platforms. However, the largest drawback of this approach is the potential lack of security: a mobile device is an open system, with a complicated operating system, many different software programs running and an always-on connection to the internet. This is at odds with the requirement that the mobile device itself needs to be authenticated, because it cannot be trusted per se.

Nowadays, more and more mobile devices, as well as PC's and laptops, are being equipped with an NFC (Near Field Communication) interface. The mobile operating system (e.g. Android and BlackBerry OS) in such devices has specific support for handling NFC connections in such a way as to make this easy and intuitive for consumers (e.g. automatic dispatching of so-called NDEF messages to start up the right app without user intervention). Therefore, equipping a security token with an NFC-compatible interface makes a lot of sense, especially if this can be combined with a way to take advantage of the mobile device's built-in support for NFC that makes it even easier and more convenient to use a security token for the consumer.

Recently, the company Yubico (http://www.yubico.com/) announced such an NFC-enabled security token. It is an enhancement to their existing USB-based products. The USB version of the product merely functions as an automatic keyboard that fills in the authentication code for the user (i.e. it eliminates the need for the user to copy the code form a display on the token). The NFC version of the product is similar: it provides the login code as part of a URL stored in an NDEF message on the device. The NFC-enabled mobile device reads out this NDEF message automatically and the proper app is started. So, again, the user does not have to copy the login code, but it is filled in automatically, like with the USB version of the product.

In general, NFC-enabled security tokens suffer from a number of drawbacks relating to security, ease-of-use and multi-application support.

Security

Creating a software app that implements a security token may be convenient, but it is, generally speaking, not secure enough. The integration of a contactless (ISO 14443) or NFC (ISO 18092) interface with a security token presents new challenges that are potentially security risks. For example, when the owner of a security token has the token in his/her pocket or bag, other people have no access to it. Access to the USB interface is essentially blocked and any display is invisible. The situation with NFC is different: as the communication is contactless, it is possible to communicate with an NFC-enabled security token right through a layer of cloth, plastic or other non-metal-containing material. For security reasons, it becomes therefore necessary to add a layer of access control to the security token itself.

Ease-of-Use

The need to copy the login code from a display of a security token is inconvenient for users. Even a mobile app like Google's Authenticator still does not make it really easy in the situation that the computing service is accessed on the same mobile device by requiring manual copying and pasting of the login code. Sometimes, security tokens are equipped with a key pad and display. The user then has to enter a personal identification number (PIN) first in order to obtain the desired log-in code. In some cases, the security token is a combination of a smart card and a (battery-powered) smart card reader with its own key pad, display and built-in clock. In that case, the combination of the smart card reader and the smart card effectively form the security token. In case of an NFC-enabled security token, however, this is highly unpractical, as the user would have to interact with his mobile device and the security token at the same time, because they have to be kept close together for the NFC connection to work.

Multiple-application Support

Currently, security tokens are generally used only for access to one single application or service. Certainly for the simplest kind of token, with only a display and no buttons or other interfaces, there is simply no possibility to support multiple applications, unless they would use the exact same security parameters in the token.

SUMMARY OF THE INVENTION

It is an object of the invention to improve NFC-enabled security tokens of the kind set forth. This object is achieved by a security token as defined in claim 1 and by a service access system as defined in claim 8.

According to an aspect of the invention, a security token for facilitating access to a remote computing service via a mobile device is conceived, said security token comprising an NFC interface, a smart card integrated circuit and a smart card applet stored in and executable by said smart card integrated circuit, wherein the smart card applet is arranged to support a cryptographic challenge-response protocol executable by the mobile device.

According to an exemplary embodiment, the cryptographic challenge-response protocol is executable between the remote computing service and the security token.

According to a further exemplary embodiment, the security token further comprises a real-time clock, wherein said real-time clock is arranged to support a time-based cryptographic authentication protocol.

According to a further exemplary embodiment, the security token further comprises an NDEF message read/write interface, wherein the cryptographic challenge-response protocol is executable via said NDEF message read/write interface.

According to a further exemplary embodiment, the smart card applet is further arranged to receive a credential for use in the cryptographic challenge-response protocol.

According to a further exemplary embodiment, the smart card applet is further arranged to receive a plurality of credentials, wherein said credentials correspond to different remote computing services.

According to a further exemplary embodiment, the smart card applet is further arranged to receive a personal identification number from the mobile device and to allow execution of the cryptographic challenge-response protocol or the time-based authentication protocol only if said personal identification number corresponds to a predefined number.

According to a further aspect of the invention, a service access system is conceived which comprises a security token of the kind set forth and a mobile device being arranged to execute the cryptographic challenge-response protocol or the time-based authentication protocol.

BRIEF DESCRIPTION OF THE DRAWINGS

The invention will be described in more detail with reference to the appended drawings, in which:

FIG. 3 illustrates a system overview comprising an access system according to an exemplary embodiment of the invention and an on-line computing service.

DESCRIPTION OF EMBODIMENTS

According to an exemplary embodiment of the invention, an NFC-enabled security token is proposed, with an, optional, built-in clock. The required security level is guaranteed by the use of a contactless smart card IC, such as one from NXP Semiconductors' SmartMX family. By implementing an NFC Forum compliant "cardlet"—also called smart card applet—that, in a preferred embodiment, presents an NDEF message to the card reader, an appropriate app on the NFC-enabled mobile device can be started automatically.

The processing capabilities of the smart card IC allow for the execution of cryptographic challenge-response protocols. Such a protocol can be executed through the use of the NDEF message read/write interface of the cardlet. The optional built-in clock allows for the use in time-based authentication systems. A clock with battery can be connected to the new P60 family of SmartMX ICs produced by NXP Semiconductors, for example. By requiring to send a personal identification number (PIN) or password to the token before the log-in code will be made accessible—or the challenge-response protocol can be performed—unauthorized persons can not only not access the token when it is in the owner's pocket, but also cannot use it when the owner looses the device.

However, requiring PIN entry detracts from the user-friendliness of the app. The PIN entry can, however, easily be hidden inside the app on the mobile device that uses the security token by automatically sending it to the token, so as not to detract from the user experience and the ease-of-use of the security token.

Currently, stand-alone security tokens cannot properly support multiple applications, due to lack of a rich user interface (i.e. lack of buttons or key pad and/or display). However, for an NFC-enabled security token, while being physically similar to such a simple token, there needs to be no such limitation. The mobile device can provide the user interface (UI) on its own display, allowing the presence of multiple (virtual) controls to configure different settings in the security token.

Thus, the proposed NFC-enabled security token provides higher overall security, higher ease-of-use and better multi-application support.

Figure 1:
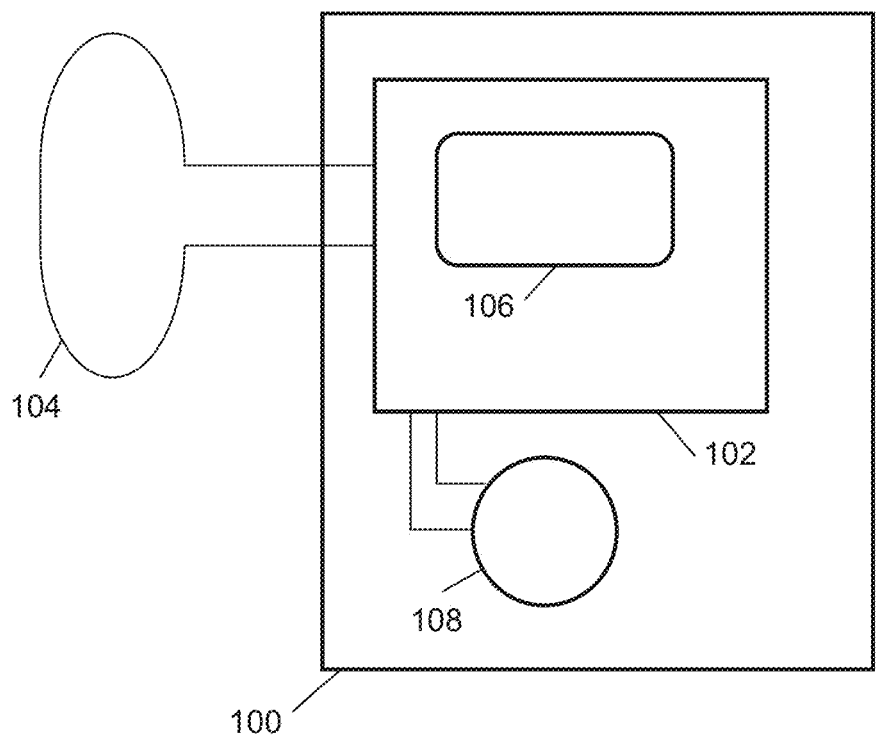
FIG. 1 illustrates an NFC-enabled security token according to an exemplary embodiment of the invention.

FIG. 1 illustrates an NFC-enabled security token according to an exemplary embodiment of the invention. The NFC-enabled security token 100 a smart card IC 102, an NFC antenna 104, a smart card applet stored in and executable by the smart card IC 102, and a battery-powered real-time clock 108.

In an example, the security token hardware may comprise a SmartMX2 smart card IC, combined in a module together with a contactless antenna connected to the SmartMX2 smart card IC, and a battery-powered real-time clock module, connected to the test pins of the SmartMX2 smart card IC.

The smart card applet (SmartMX "cardlet") may be an implementation of the NFC Forum Type 4 Tag standard. In particular, the cardlet is implemented as a smart card applet which uses an ISO 7816-4 compatible file system for NDEF message-related storage and retrieval. It supports the storage and retrieval of NDEF messages through the NFC-enabled device's NFC Application Programming Interface (such as Android's Java class "Ndef"). The cardlet can communicate with a real-time clock module through the 2 test pins of the SmartMX2.

Figure 2:
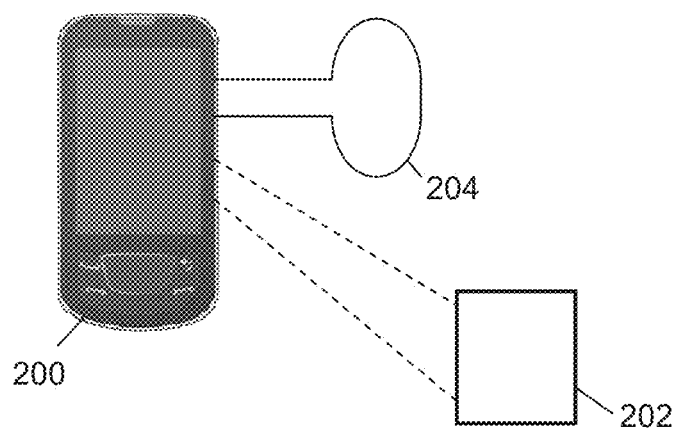
FIG. 2 illustrates an NFC-enabled mobile device according to an exemplary embodiment of the invention.

FIG. 2 illustrates an NFC-enabled mobile device according to an exemplary embodiment of the invention. The NFC-enabled mobile device 200 comprises a smart card reader IC 202 and an NF antenna 204. In operation, the smart card reader IC 202 reads and writes NDEF messages from, respectively to, the smart card applet 106, which enables the NFC-enabled mobile device 200 to execute a cryptographic challenge-response protocol between a remote on-line computing service and the security token 100. Furthermore, a proper "app" (not shown), i.e. a computer program, is automatically started on the NFC-enabled mobile device 200 used to access the on-line computing service through the use of a distinctive NDEF message type for which the app on the NFC-enabled mobile device 200 has registered itself. This special NDEF message is automatically provided by the security token 100 after it is activated (i.e. powered on) by the RF field of the NFC-enabled mobile device 200. The NFC-enabled mobile device 200 may execute the cryptographic challenge-response protocol by writing an NDEF message containing the challenge (obtained from the on-line computing service) and by reading back an NDEF message containing the response from the security token 100.

Initialization

Normally, a credential needs to be loaded into the smart card applet 106 before the challenge-response protocol can be executed. The credential may, for example, comprise one or more secret key values, a PIN and, optionally, a clock synchronization value. The credential may be loaded into the smart card applet 106 by writing a special NDEF message into it containing these values. After writing these values, they cannot be retrieved anymore from the security token 100; this can easily be implemented by simply not providing any functionality for such retrieval.

PIN-based Access to the Security Token

In order to prevent unauthorized access to authentication functionality of the security token 100, e.g. unauthorized access by another NFC-enabled mobile device, the app on the NFC-enabled mobile device 200 has to provide a PIN to get access to the security-token functionality. The PIN is provided to the smart card applet 106 as a separate record in the NDEF message, combined with (if needed) the challenge value for the challenge-response protocol. An additional identifier may be provided to select a specific credential set. In that way, multiple credentials can be maintained inside a single security token. In that case, the user would have to select the proper credentials to be used in a graphical user interface (GUI) of the app on the NFC-enabled mobile device 200.

NDEF Messages

To enable reading data from and writing data to various types and makes of NFC-compatible contactless cards and tags and to enable responding or reacting to such data, the NFC Forum has standardized, among other things, an exact data format, containing one or more records, each containing a record type and payload. A message in this format is called an NDEF message (NDEF=NFC Forum Data Exchange Format). To support as many NFC-enabled mobile devices as possible, it is preferred to use a unique custom MIME type for the message type, for example "application/vnd-.nxp.securitytoken". The (optional) addition of a special record that guarantees that only the proper app will be started (e.g. an Android Application Record) is possible. The payload of the message depends on the protocol that is being used for authentication and whether the protocol has started already or not, or whether initialization is being performed. In case of a time-based access control method, the payload could simply be the required login code encoded as an alphanumeric ASCII string.

FIG. 3 illustrates a system overview comprising an access system according to an exemplary embodiment of the invention and an on-line computing service. The complete system 300 comprises an on-line computing service 302 and a service access system 306. The on-line computing service 302 may, for example, be a so-called "cloud" service. The service access system comprises the NFC-enabled security token 100 and the NFC-enabled mobile device 200. The NFC-enabled mobile device 200 communicates with the on-line computing service 302 via a communication channel 304. As mentioned above, the NFC-enabled mobile device 200 executes a cryptographic challenge-response protocol between the on-line computing service 302 and the security token 100. Several cryptographic challenge-response protocols may be used, which are known per se. A set of standardized protocols that is in actual use with a number of cloud-based services is available under the name of "OATH". OATH is a collection of authentication protocols (RFC 4226, RFC 6238 and RFC 6287) maintained by the Initiative for Open Authentication. The protocol suite includes a time-based authentication mechanism.

It is noted that the drawings are schematic. In different drawings, similar or identical elements are provided with the same reference signs. Furthermore, it is noted that in an effort to provide a concise description of the exemplary embodiments, implementation details which fall into the customary practice of the skilled person may not have been described. It should be appreciated that in the development of any such implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMBERS 100 security token
102 smart card IC
104 NFC antenna
106 smart card applet
108 real-time clock
200 NFC-enabled mobile device
202 smart card reader IC
204 NFC antenna
300 system overview
302 on-line service
304 communication channel
306 service access system

The invention claimed is:

1. A security token configured to facilitate access to a remote computing service via a mobile device external to said security token, said security token comprising:
 a Near Field Communication (NFC) interface;
 a smart card integrated circuit; and
 a smart card applet stored in and executable by said smart card integrated circuit, wherein the smart card applet is configured to support a cryptographic challenge-response protocol executable by the mobile device, wherein a plurality of credentials for the cryptographic challenge-response protocol are maintained inside a single security token.

2. The security token as claimed in claim 1, wherein the cryptographic challenge-response protocol is executable between the remote computing service and the security token.

3. The security token as claimed in claim 1, further comprising:
 a real-time clock, wherein said real-time clock is configured to support a time-based cryptographic authentication protocol.

4. The security token as claimed in claim 1, further comprising:
 a NFC Data Exchange Format (NDEF) message read/write interface, wherein the cryptographic challenge-response protocol is executable via said NDEF message read/write interface.

5. The security token as claimed in claim 1, wherein the smart card applet is further configured to receive a credential for use in the cryptographic challenge-response protocol.

6. The security token as claimed in claim 5, wherein the plurality of credentials correspond to different remote computing services.

7. The security token as claimed in claim 3, wherein the smart card applet is further configured to receive a personal identification number from the mobile device and to allow execution of the cryptographic challenge-response protocol or the time-based cryptographic authentication protocol only if said personal identification number corresponds to a predefined number.

8. A service access system comprising the security token as claimed in claim 3, the service access system further comprising:
 a mobile device external to said security token and configured to execute the cryptographic challenge-response protocol or the time-based cryptographic authentication protocol.

9. The security token of claim 1, wherein the smart card applet uses an ISO 7816-4 compatible file system.

10. The security token of claim 1, wherein each credential of the plurality of credentials comprises one or more secret values and a Personal Identification Number (PIN).

11. The security token of claim 10, wherein each credential further comprises a clock synchronization value.

* * * * *